United States Patent [19]
Schwarzbich

[11] Patent Number: 5,717,180
[45] Date of Patent: Feb. 10, 1998

[54] LATCH ELEMENT WITH INTEGRATED SWITCH

[76] Inventor: Jörg Schwarzbich, Wertherstr. 15, 33615 Bielefeld, Germany

[21] Appl. No.: 616,889

[22] Filed: Mar. 18, 1996

[30] Foreign Application Priority Data

Mar. 17, 1995 [DE] Germany .................. 195 09 878.1

[51] Int. Cl.$^6$ ...................................................... H01H 9/06
[52] U.S. Cl. ............................................................ 200/61.88
[58] Field of Search ............................................. 200/61.88

[56] References Cited

U.S. PATENT DOCUMENTS

| | | | |
|---|---|---|---|
| 1,592,977 | 7/1926 | Johnson | 200/61.88 |
| 3,423,549 | 1/1969 | Sondej | 200/61.88 |

FOREIGN PATENT DOCUMENTS

| | | |
|---|---|---|
| 6607099 U | 1/1971 | Germany . |
| 38 18 562 | 12/1989 | Germany . |
| 39 17 659 | 12/1990 | Germany . |
| 9400632 U | 5/1994 | Germany . |
| 43 07 596 | 9/1994 | Germany . |

*Primary Examiner*—Stuart N. Hecker
*Attorney, Agent, or Firm*—Burns, Doane, Swecker & Mathis, L.L.P.

[57] ABSTRACT

A gear selector shaft of a vehicle transmission is held in respective positions by a yieldable latch element. The latch element actuates a switch when the gear selector shaft is in a predetermined position, such as in a reverse mode, so as to energize the back-up lights of the vehicle. The latch element is displaced by the gear selector pattern of the selector shaft in order to displace an actuator of the switch. A flexible steel membrane separates the actuator from the latch element. The latch element includes a first portion engageable with the gear selector shaft, and a second portion for displacing the switch actuator. The first and second portions are movable relative to one another once the switch actuator has deactivated the switch, so that the first portion can be further displaced without causing further displacement of the switch actuator and membrane.

5 Claims, 4 Drawing Sheets

LATCH ELEMENT WITH INTEGRATED SWITCH

RELATED INVENTION

This invention is related to an invention disclosed in the inventor's concurrently filed application Ser. No. 08/616, 887, entitled "Arresting Screw For Vehicle Transmissions," the disclosure of which is incorporated herein by reference.

BACKGROUND OF THE INVENTION

The subject of the invention is a latch element having a latch link which is biased in an elastic manner against a gearshift pattern of a vehicle gear-selector shaft to yieldably retain the selector shaft in selected positions, and a switch which is separated from the latch link by means of a membrane, wherein the actuating mechanism of the switch is prestressed in an elastic manner toward the latch link. The switch turns on the back-up lights of the vehicle when the reverse gear is selected.

Such a latch element is used to maintain the selector shaft of a gear box in the respective gear position, and the switch can produce a signal which indicates a certain position of the transmission. For example, this switch can be used to turn on the back-up lights when the reverse gear is engaged.

By integrating the switch directly with the latch element, a separate back-up light switch is no longer necessary. This means that the different transmission types in which the latch element is used can be simplified and manufactured in a more cost effective manner. This construction principle was first proposed by the applicant of the present invention in DE 43 07 596 A1.

Similar to the customary separate back-up light switches, the switch should be separated from the latch element by means of a flexible membrane so that the electrical components of the switch are protected against the oil in the transmission casing. Customary switches use relatively expensive elastic rubber membranes which are Teflon® coated in order to prevent the diffusion of oil through the membrane.

In order to ensure that the switch is activated only when the reverse gear is engaged, the part of the gearshift pattern which corresponds to the reverse gear must have a different depth than the remaining valleys of the gearshift pattern. An especially simple and practical arrangement is one in which the valley which corresponds to the reverse gear is deeper than the remaining valleys. This makes it possible to design the switch with relative simplicity so that it only closes when the latch link is in the extended valley for the reverse gear and remains inactivated when the latch link traverses the peaks between adjacent valleys of the gearshift pattern, or latches into one of the positions designating a the forward gear. In addition this arrangement makes it possible to have the back-up lights turn on when the reverse gear is engaged only shortly before the reverse position is reached and to turn off immediately after the reverse gear is disengaged as soon as the latch link leaves the deepest position.

However, this arrangement still is disadvantageous in that the membrane and the actuating mechanism of the switch must be deflected to a relatively large degree while the latch link traverses the peaks of the gearshift pattern. There must be a sufficient difference in height between the peaks and the valleys of the gearshift pattern so that the selector shaft is maintained securely, and so that the driver has a clear feeling for what gear he or she is in. Much shorter travels would be needed to ensure that there is sufficient contact clearance in the switch. Excessively long travel results in a high degree of wear and tear in the switch and above all causes the membrane to fatigue quickly.

The object of the invention is to design a latch element of the type described above which guarantees a long life of the switch and the membrane even if the latch link must overcome great differences in height while scanning the gearshift pattern, and the break-over point of the switch corresponds to an extended-depth valley of the gearshift pattern. The means for attaining the object of the invention are comprised of a travel adjustment element (i.e., a lost-motion connection) which can be compressed in an elastic manner and which is inserted between the latch link and the membrane.

This makes it possible to reduce the switch-operating travel in the switch to a value which corresponds to the minimum contact clearance required to achieve the inactive state of the switch, even though the latch link which activates the switch can carry out considerably higher lifts. When the latch link leaves the deepest valley of the gearshift pattern which designates the reverse gear, for example, then the travel adjustment element overcomes the elastic pre-stress of the actuating mechanism of the switch, and the switch is actuated in the customary manner so that the fact that the reverse gear position is disengaged is signalled immediately. If during the further course of the gear shifting process the latch link traverses the flank of a peak of the gearshift pattern, then the actuating mechanism of the switch is pushed against a stop which limits further travel. At this instant the travel adjustment element, which can be compressed in an elastic manner, experiences a larger resistance so that it is compressed and thus compensates for the further lift of the latch link. This makes it possible to switch gears in a smooth and easy manner while the switch only experiences minimal travel and membrane deflections. This above all increases the life of the membrane considerably.

Another advantage of the invention is that the travel adjustment element limits the total clearance between the latch link and the actuating mechanism of the switch to a minimum in all movement phases or can eliminate it all together so that it is possible to change gears easily and to minimize the noise level.

By reducing the deflection of the membrane to a minimum in accordance with the invention it is possible to advantageously use steel as a material for the membrane instead of the customary coated plastic membranes. This steel membrane can be produced and installed in a cost-advantageous manner, has a very long life and prevents oil diffusion into the switch casing without any expensive coating measures.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIGS. 1 through 3 show longitudinal sections through a latch element with a and switch according to the invention in different operating positions, wherein FIG. 1 shows the switch in a closed (operative) position, with the gear selector in "reverse";

FIG. 2 shows the switch in an open (inoperative) position as the gear selector leaves "reverse"; and FIG. 3 shows a lost-motion connection of the latch being effective as the latch traverses a peak of the gearshift profile;

DETAILED DESCRIPTION OF PREFERRED EMBODIMENTS OF THE INVENTION

Figure 1:
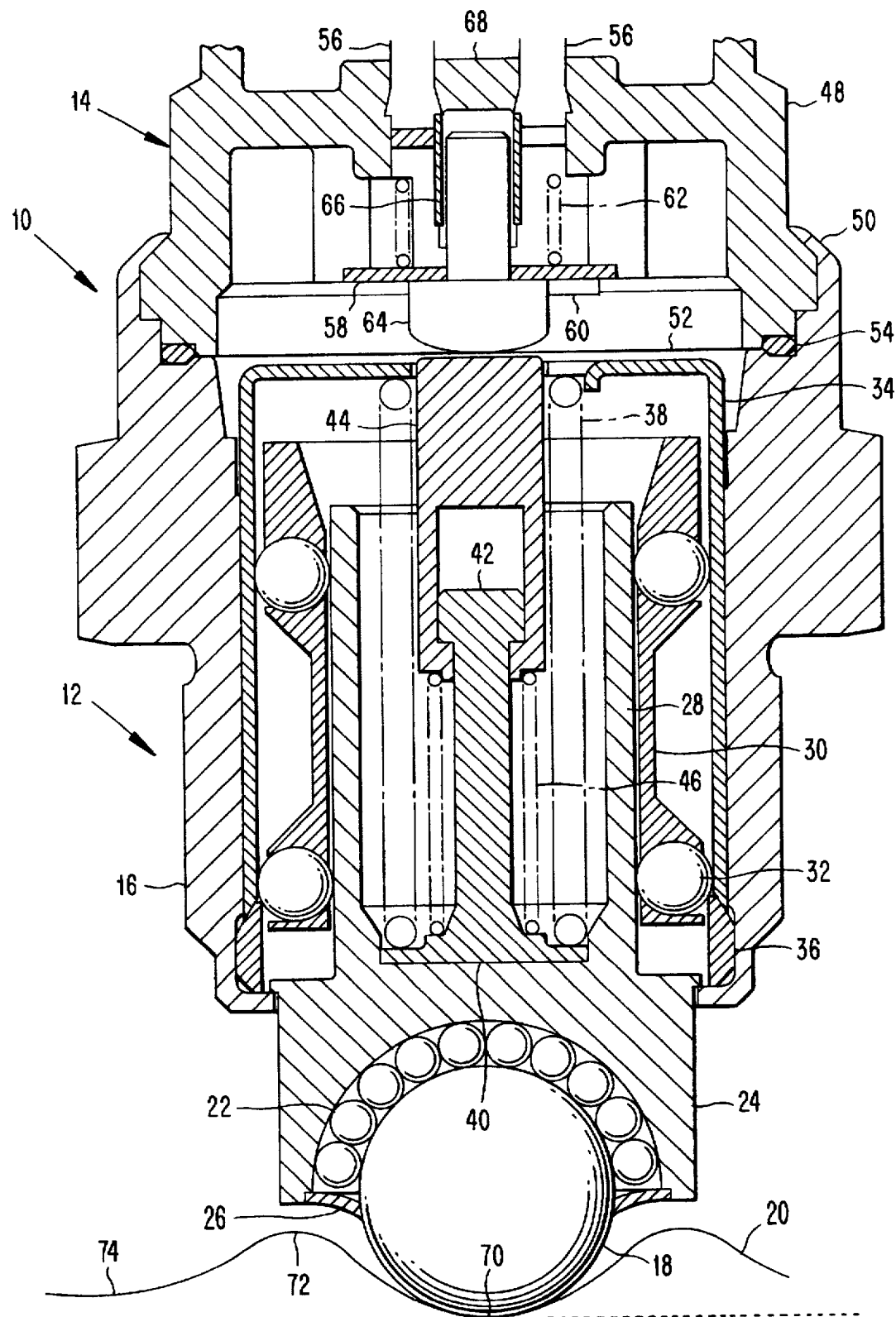

The latch element 10 shown in FIG. 1 is comprised of an arresting screw 12 combined with an electric switch 14 which can be a switch for the back-up lights of a vehicle, for example.

The arresting screw 12 has a metal housing 16 in the form of a hollow bolt, for example, which has an external screw thread and a key (hexagonal) profile for receiving a tool to enable the housing 16 to be screwed into a transmission casing which is not shown. A latch ball 18 is located at the end of the arresting screw which extends into the transmission casing, with the latch ball tracking the gearshift pattern 20 of a gear selector shaft. The latch ball 18 is located in a low friction manner in a bearing shell 24 by means of support balls 22 and is secured by means of a retaining ring 26.

The bearing shell 24 forms the end of a cylindrical sleeve 28 which is mounted in a ball bearing assembly 30 and can be moved axially within a limited range inside the housing 16 of the arresting screw 12. An outer track for the balls 32 of the ball bearing assembly 30 is formed by a frame 34 which is made from deep-drawn and hardened sheet-steel pressed into the housing 16. The frame is supported by a conical ring 36 at its open lower end. The upper end of the frame 34, which is closed except for one small central opening, provides an abutment for a spring 38. The spring 38 runs axially inside the sleeve 28 with its lower end resting against a retaining pin 40 which in turn rests against the lower end of the sleeve 28. The latch ball 18 and the sleeve 28 together form a latch link which is prestressed elastically toward the gearshift pattern 20 by means of the spring 38.

The upper end of the retaining pin 40 has an enlarged head 42 which is guided telescopingly in a pressure pin 44 and whose center area is surrounded by another spring 46 which rests against the plate-shaped lower end of the retaining pin and whose upper end pushes the pressure pin 44 against the head 42.

The retaining pin 40, the pressure pin 44 and the spring 46 together form a telescope-like travel adjustment element (or lost-motion connection) which can be compressed in an elastic manner and which is used to actuate the switch 14.

Only the portion of the switch 14 is shown which accommodates the switching contacts. The switch is mainly comprised of a plastic cylinder shaped housing 48 whose lower end is inserted into the upper end of the housing 16 of the arresting screw 12 and which is securely connected to the arresting screw by means of a flared flange 50, for example. A membrane 52 which is comprised of a thin, small steel plate and a conical nipple 54, is mounted between the housings 16 and 48 of the arresting screw 12 and the switch 14, respectively. The membrane 52 separates the inside of the switch housing from the arresting screw so that the electrical components of the switch are protected against penetrating oil.

There are two contact pins 56 in the housing 48 of the switch 14. Inside the housing 14 these contact pins 56 are guided around an annular contact bridge 58 at a distance where they form two electrical contacts 60 located on the lower side of the contact bridge 58. In the figure, only the contact 60 of the right contact pin 56 is visible.

The contact bridge 58 is prestressed in an elastic manner in the direction of the membrane 52 by means of a spring 62 and rests against a head of an actuating mechanism 64 which can be moved axially in a sleeve 66 disposed in the housing 14. The actuating mechanism 64 is situated opposite the face of the pressure pin 44 located on the other side of the membrane. A separating wall 68 of the housing limits the movement range of the actuating mechanism 64, with the wall providing a stop for the shaft of the actuating mechanism which is guided in the sleeve 66.

FIG. 1 shows the switch 14, which is a break contact type, in an operative (closed) state. The contact bridge 58 rests against the contacts 60 and the head of the actuating mechanism 64 rests against or is close to the membrane 52 which is not deflected.

In FIG. 1 the pressure pin 44 is in its upper position with regard to the retention pin 40. However, it can barely reach the membrane 54 since the sleeve 28 and the latch ball 18 are in their lower position. In this case the latch ball 18 is in an especially deep valley 70 of the gearshift pattern. This valley corresponds to the reverse gear, for example. The switch 14 is closed in this position which means that the back-up lights of the vehicle are on.

When the position of the gears is changed, the latch ball 18 leaves the valley 70 and makes contact with a peak 72 of the gearshift pattern 20. As is shown in FIG. 2, the switch 14 is opened already in the beginning phase of this movement, i.e., the contact bridge is lifted off the contacts 60.

That is, the latch ball 18, the bearing shell 24 and the sleeve 28 move upward a little and take the retaining pin 40 along. Since the spring 46 which prestresses the pressure pin 44 upward is stronger than the sum of the force of the spring 62 and the restoring force of the membrane 52, the pressure pin 44 moves upward as well so that the actuating mechanism 64 is lifted from the contacts 60 causing the contact to be interrupted.

Figure 2:
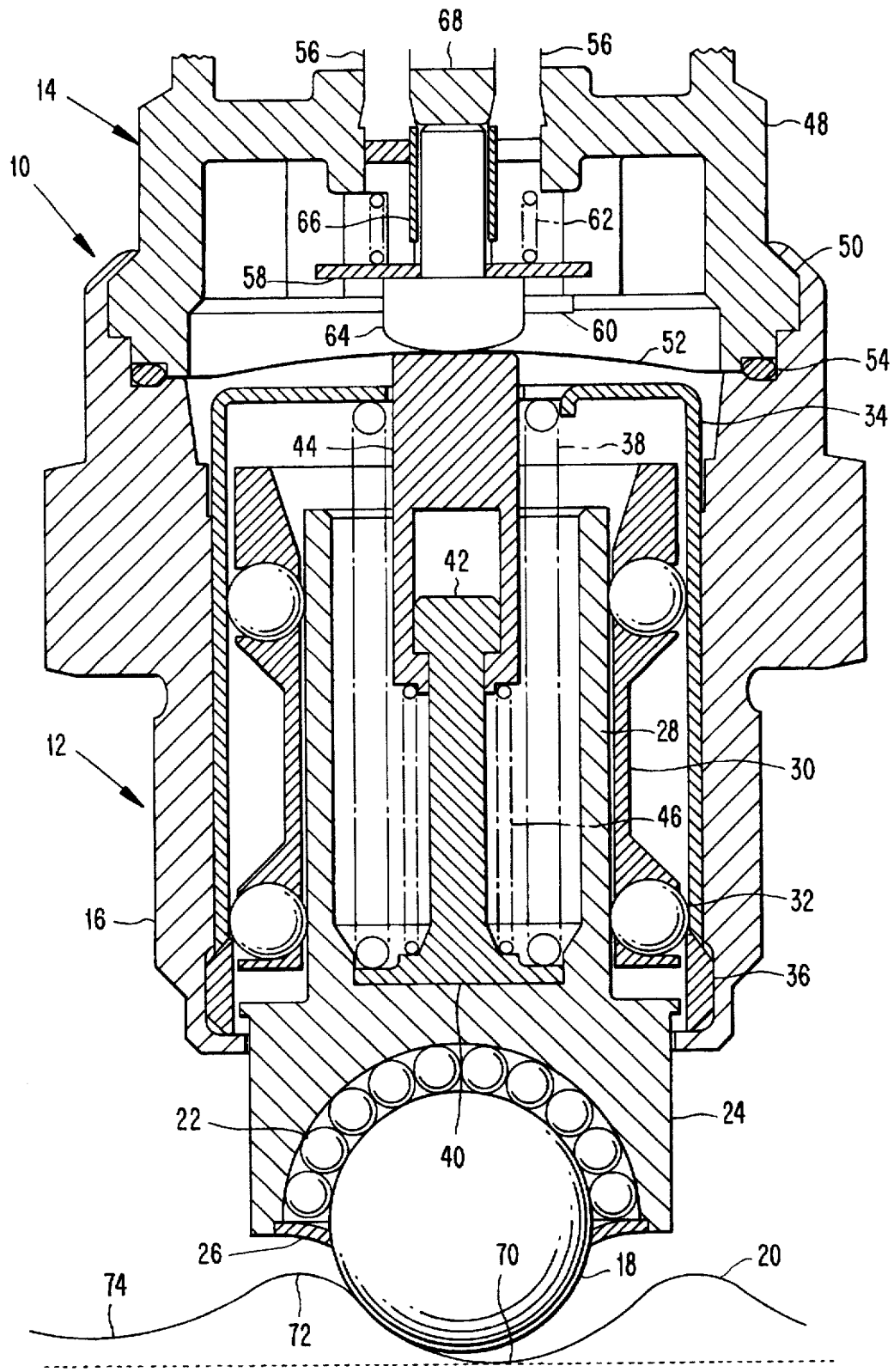

The travel of the actuating mechanism 64 and the deflection of the membrane 52 are somewhat exaggerated in FIG. 2 and in practical applications only need to amount to approximately 0.5 mm. This ensures a high operating threshold sensitivity of the back-up light switch on the position of the selector shaft which carries the gearshift pattern 20.

The actuating mechanism 64 has reached its upper position in FIG. 2 in which it rests against the internal partition 68 of the housing 48.

Figure 3:
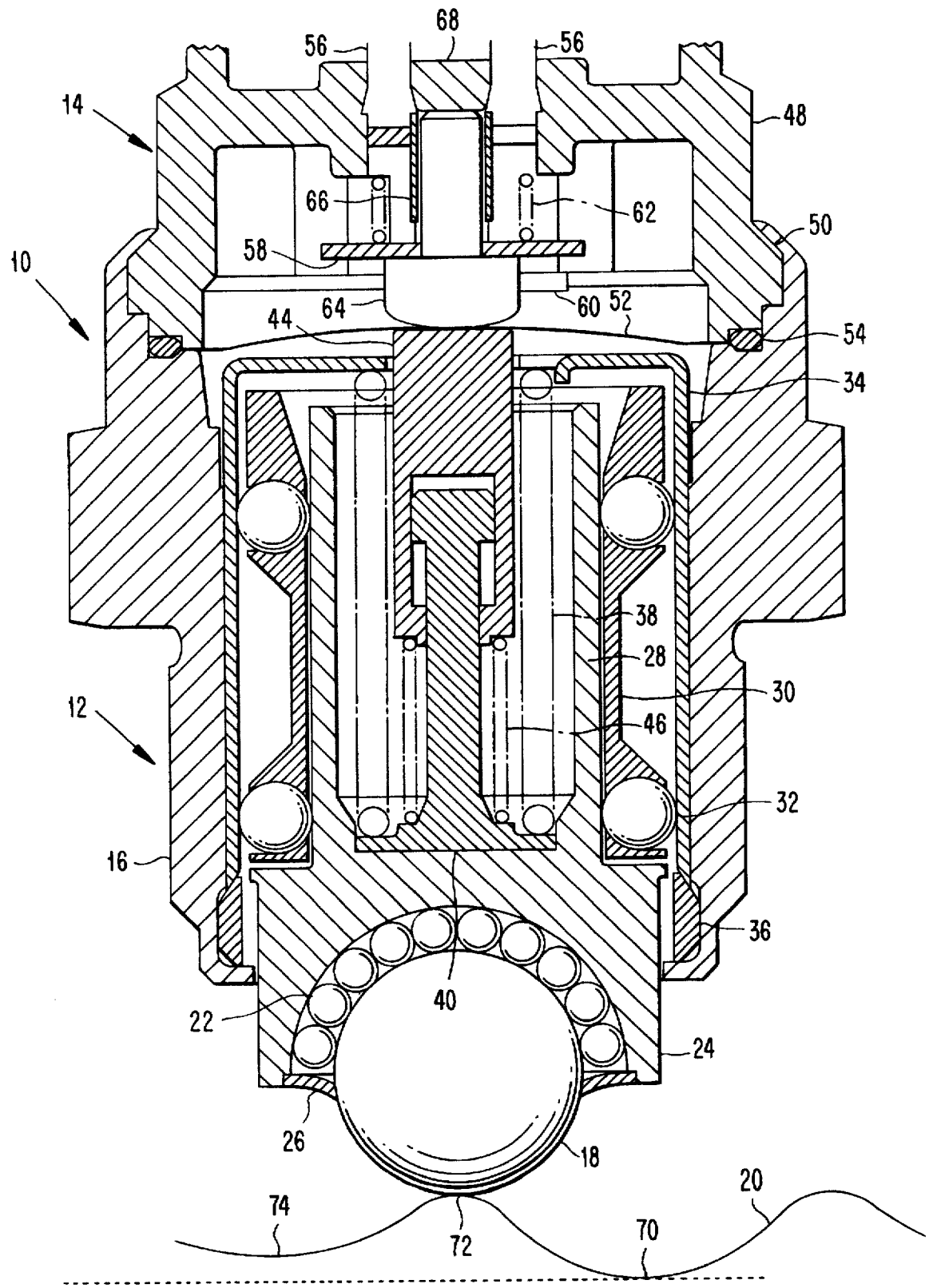

In the further course of the gear shifting process the latch ball 18 must move upward further and must overcome the peak 72 of the gearshift pattern before it can fall into the next valley 74 which represents one of the forward gears. Since the actuating mechanism 64 of the switch 14 is at the stop already, the membrane 52 cannot be deflected anymore and the pressure pin 44 cannot move upward anymore. However, the latch ball 18 can move further because the retaining pin 40 slides within the pressure pin 44 (i.e., a lost-motion connection), accompanied by compression of the spring 46. This enables the latch ball 18 to follow the contour of the gearshift pattern 20 and to travel considerably higher than the travel of the switch 14 and the deflection of the membrane 52. FIG. 3 shows the state in which the latch ball 70 has reached the top of the peak 72.

Spring 46 offers a little more resistance to the upward movement of the latch ball 18 than the spring 62 offers when the reverse gear position is left. However, the driver can barely feel this difference since the force of the spring 38 is much higher for the process of overcoming the overall resistance to lift the latch ball.

The drawing shows that the valleys 74 of the gearshift pattern 20 which correspond to the forward gear positions or the neutral position are not as deep as the valley 70. The height differential corresponds to at least the travel of switch 14 so that the switch is closed only when the reverse gear is engaged. When the latch ball is located on the bottom of valley 74, the state of the arresting screw 12 and the switch 14 approximately correspond to the state shown in FIG. 2.

The above exemplary embodiment can be modified in may different ways.

For example, the switch 14 can also be a make contact type. It is also possible to use a switch which can be switched between two switching positions or a sensor which has a certain switching hysteresis.

It is possible to reverse the relationship of the pressure pin 44 and retaining pin 42, i.e., wherein the pressure pin 44 extends into the retaining pin 42. It is also possible to move the spring 46 into the inside of the retaining pin so that it rests between the head 42 and the ceiling of the chamber formed inside the retaining pin.

By reducing the extent of the deflection of the membrane, due to the lost-motion connection defined by the telescoping relationship of the members 42, 44, the membrane can be formed of steel rather than coated plastic; whereby the lifespan of the membrane is enhanced.

A possible problem in latch elements with integrated switches could be that there is an overall, relatively large distance between the switching mechanism 64 of the switch and the gearshift pattern of the selector shaft with this distance being bridged by several connecting links. The dimensional tolerances which are inevitable when these connecting links are produced, therefore, can add up to a value which is on the order of the travel distance of the switch, especially since this travel distance is very small in the arrangement according to the invention.

Figure 4:
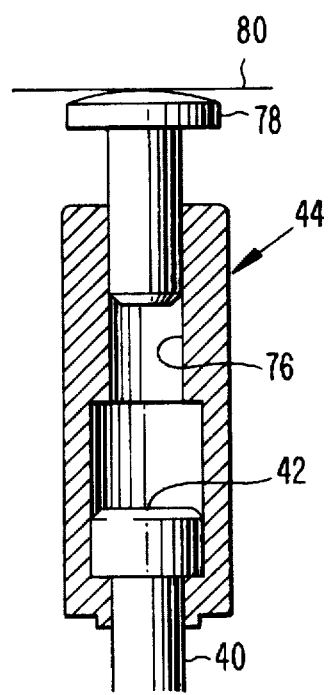
FIGS. 4 through 6 show a modified embodiment of a travel adjustment element according to the invention in three different states, respectively.
Figure 5:
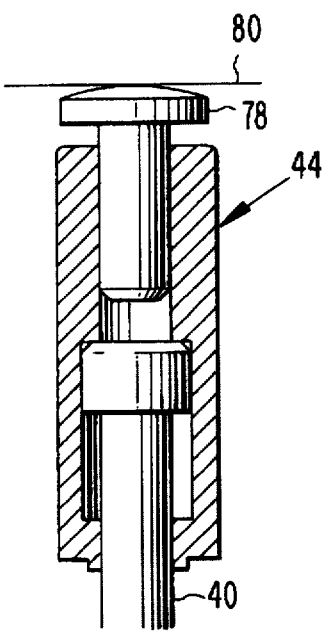
Figure 6:
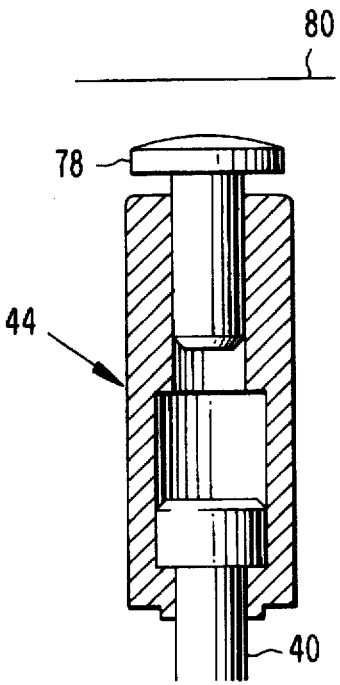

FIGS. 4 through 6 illustrate a self-adjustment feature for solving this problem.

In the embodiment in accordance with FIGS. 4 through 6 the pressure pin 44 has an axial bore 76. A compensating pin 78 has a mushroom-shaped head for actuating the switch as well as a telescoping shaft 78 which is maintained with a press fit in the bore 76.

During the manufacture and installation of the mechanism, the compensating pin 48 is pushed into the bore 76 until it still protrudes relatively far. After the membrane 52 is inserted and the switch 14 is installed, the membrane and the actuating mechanism 64 together form a stop which is indicated by line 80 in FIGS. 4 through 6. A stop is formed since the actuating mechanism can engage the internal partition 68 of the switch housing.

When the latch ball 18 travels over a peak 72 of the gear shift pattern for the first time after the arresting screw 12 is screwed into the bearing housing, the pressure pin 44 is lifted until the compensating pin 78 reaches the stop 80. First the retaining pin 40 can retract further into the pressure pin 44 while the spring 46 is compressed further. When, however, the head 42 of the retaining pin has reached its upper final position with regard to the pressure pin 44 (FIG. 5) then the pressure pin 44 must also move upward further so that the compensating pin 78 pushes deeper into the bore 76. The compensating pin 78 thus reaches its final position with regard to the pressure pin 44 when the latch ball 18 travels over the highest peak of the gearshift pattern.

When the latch ball and the pressure pin 44 are lowered again (FIG. 6) then the compensating pin 78 is maintained in a non-positive manner in a permanent position which it has reached with regard to the pressure pin 44. From this moment on the position of the compensating pin 78 is such that all dimensional tolerances of the arresting screw 16 and the switch 14 are adjusted once and for all.

The overall length of each connecting link including: (i) the latch ball 18, (ii) the travel adjustment element (in a completely compressed state), and (iii) the actuating mechanism 64 of the switch, is adjusted in the above-described manner so that it corresponds exactly to the distance between the top of the peak 72 of the gearshift pattern and the internal partition 68 of the switch housing (which acts as a stop for the actuating mechanism 64). This means that only the dimensional tolerances, which are negligibly small, can now have an effect on the switching point of the switch, with the tolerances determining the differences in level between the peaks and the valleys of the gearshift pattern as well as the extension length of the pressure pin 44 relative to the retaining pin 40. Since this length does not exceed a few millimeters, even a dimensional tolerance on the order of 1% ensures that the remaining dimensional tolerances are clearly smaller than the travel of approximately 0.5 mm. This ensures that the switching point can be set with a high degree of precision and that the switch works properly.

In a modification of the above exemplary embodiment, the compensating pin 78 could be located in the actuating mechanism 64 of the switch instead of in the pressure pin 44.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination, a switch and a latch element engageable with a gearshift pattern of a gear selector shaft of a vehicle for actuating the switch; the latch element being elastically prestressed against a gear selector shaft, the switch including an actuator for operating the switch; the actuator being elastically biased toward the latch element; a membrane isolating the actuator from the latch element; the latch element including a first portion for engaging a gearshift pattern, and a second portion for displacing the actuator and deflecting the membrane; the first and second portions being movable together as a unit during a first stage of travel of the latch for displacing the actuator by a predetermined distance; the first portion being movable relative to the second portion during a second stage of travel of the latch to enable the first portion to move without producing a displacement of the actuator and a deflection of the membrane; the latch element including a retaining pin and a pressure pin telescopingly interconnected for relative movement; the retaining pin defining the first portion, and the pressure pin defining the second portion; a spring provided for biasing the retaining pin and pressure pin away from one another toward an extended maximum-length state of the latch element; wherein the second portion includes a pressure pin and a tolerance compensating pin connected telescopingly with the pressure pin by a press fit, the tolerance compensating pin being movable with respect to the pressure pin to a direction shortening an overall length of the first portion during an initial switch-actuating movement of the latch element to establish a permanent effective length of the first portion which compensates for dimensional tolerances between the gearshift pattern and the actuator of the switch.

2. The combination according to claim 1 including a stop for preventing movement of the first and second portions as a unit at the end of the first stage.

3. The combination according to claim 2 wherein the stop is disposed in the switch and is engaged by the actuator as the actuator is being displaced by the latch element while the first and second portions are moving as a unit.

4. The combination according to claim 1 wherein the membrane is formed of steel.

5. The combination according to claim 1, wherein travel of the retaining pin and pressure pin to the maximum-length state of the latch element is limited by a stop, such that in the maximum-length state of the latch element the first and second portions together extend substantially the entire distance between the gearshift pattern and the membrane without deflecting the membrane.

* * * * *